US012758042B2

(12) United States Patent
Mirza

(10) Patent No.: US 12,758,042 B2
(45) Date of Patent: Oct. 13, 2026

(54) MULTI-UTILITARIAN IMPLEMENT SUITABLE FOR USE ON THE DINING TABLE

(71) Applicant: BALA INDUSTRIES AND ENTERTAINMENT PRIVATE LIMITED, Pune (IN)

(72) Inventor: Mohammad Idrees ul Haq beigh Mirza, Srinagar (IN)

(73) Assignee: BALA INDUSTRIES AND ENTERTAINMENT PRIVATE LIMITED, Pune (IN)

( * ) Notice: Subject to any disclaimer, the term of this patent is extended or adjusted under 35 U.S.C. 154(b) by 223 days.

(21) Appl. No.: 18/551,528

(22) PCT Filed: May 3, 2021

(86) PCT No.: PCT/IB2021/053683
§ 371 (c)(1),
(2) Date: Sep. 20, 2023

(87) PCT Pub. No.: WO2022/200840
PCT Pub. Date: Sep. 29, 2022

(65) Prior Publication Data

US 2024/0164559 A1 May 23, 2024

(30) Foreign Application Priority Data

Mar. 20, 2021 (IN) ............................ 202121011953

(51) Int. Cl.
*A47G 21/06* (2006.01)
*A47G 21/02* (2006.01)
*B26B 9/02* (2006.01)

(52) U.S. Cl.
CPC ............. *A47G 21/06* (2013.01); *A47G 21/02* (2013.01); *A47G 21/103* (2013.01); *B26B 9/02* (2013.01)

(58) Field of Classification Search
CPC ...... A47G 21/06; A47G 21/02; A47G 21/103; A47G 21/181; A47G 2400/025;
(Continued)

(56) References Cited

U.S. PATENT DOCUMENTS

2002/0092181 A1 7/2002 Choi
2020/0128983 A1* 4/2020 Yiu ........................... D21J 3/00

FOREIGN PATENT DOCUMENTS

BR 202013020936 U2 * 10/2015 ............... B26B 9/02
CN 106820868 A * 6/2017 ............. A47G 21/04
(Continued)

OTHER PUBLICATIONS

KR_20140000962_U_ (Year: 2014).*
(Continued)

*Primary Examiner* — Jonathan G Riley
(74) *Attorney, Agent, or Firm* — LADAS & PARRY LLP

(57) ABSTRACT

The present disclosure is related to dinnerware, and envisages a multi-utilitarian implement suitable for use on the dining table. The implement comprises a spork defined by a shallow scoop having a plurality of tines configured on a first distal end of the scoop; and a handle detachably connected to a second distal end of the scoop. The handle comprises a two-edged knife element and a pair of chopsticks. The knife element has a pair of lateral edges, each lateral edge being configured as a type of a knife. The chopsticks are detachably joined to an operative first end of the knife element, to act as the handle in an attached state with the knife element.

25 Claims, 10 Drawing Sheets

(58) Field of Classification Search
CPC ...... A47G 21/023; A47G 21/04; A47G 21/18; B26B 9/02; B26B 3/02
See application file for complete search history.

(56) References Cited

FOREIGN PATENT DOCUMENTS

| | | | | |
|---|---|---|---|---|
| KR | 20140000962 U | * | 2/2014 | ........... A47G 29/087 |
| WO | 2008066555 A1 | | 6/2008 | |

OTHER PUBLICATIONS

BR_202013020936_U2 (Year: 2015).*
CN_106820868_A (Year: 2017).*
ISR for International Application No. PCT/IB2021/053683 mailed Aug. 25, 2021.
Written Opinion for International Application No. PCT/IB2021/053683 mailed Aug. 25, 2021.

* cited by examiner

MULTI-UTILITARIAN IMPLEMENT SUITABLE FOR USE ON THE DINING TABLE

CROSS-REFERENCE TO RELATED APPLICATIONS

This application is a U.S. National Stage Application under 35 U.S.C. § 371 of International Application No. PCT/IB2021/053683 which was filed on 3 May 2021. This application claims priority to and the benefit of Indian Patent Application number 202121011953 filed 20 Mar. 2021, the disclosures of which are incorporated in their entirety by reference herein.

FIELD

The present disclosure relates to the field of dinnerware, more specifically cutlery pieces.

BACKGROUND

The background information herein below relates to the present disclosure but is not necessarily prior art.

Over the years, design and manufacturing of dinnerware have grown to cater to the culinary needs efficiently. Spoons, forks, knives and chopsticks have been conventionally used across different cultures for years.

However, it becomes inconvenient for a user to carry the dinnerware everywhere, especially while eating in a standing posture or while camping, since the individual cutlery pieces need to be handled separately.

There is therefore felt a need for a cutlery implement, that alleviates the aforementioned drawback.

OBJECTS

Some of the objects of the present disclosure, which at least (me embodiment herein satisfies, are as follows:

It is an object of the present disclosure to ameliorate one or more problems of the prior art or to at least provide a useful alternative.

An object of the present disclosure is to provide an implement, which can be used for a single culinary function, or used simultaneously for multiple culinary functions.

Still another object of the present disclosure is to provide a cutlery implement, which can be carried anywhere and handled with case.

Yet another object of the present disclosure is to provide a cutlery implement, which can be packed as a single unit.

Still another object of the present disclosure is to provide a cutlery implement, which is reusable.

Other objects and advantages of the present disclosure will be more apparent from the following description when read in conjunction with the accompanying figures, which are not intended to limit the scope of the present disclosure.

SUMMARY

The present disclosure envisages a multi-utilitarian implement suitable for use on the dining table. The implement comprises a spork defined by a shallow scoop having a plurality of tines configured on a first distal end of the scoop. A handle is detachably connected to a second distal end of the scoop. The handle comprises a two-edged knife element and a pair of chopsticks. The knife element has a pair of lateral edges, each lateral edge being configured as a type of a knife. The chopsticks are detachably joined to an operative first end of the knife element. The chopsticks configured to act as the handle in an attached state with the knife element.

BRIEF DESCRIPTION OF THE ACCOMPANYING DRAWING

A multi-utilitarian implement, of the present disclosure, suitable for use on the dining table will now be described with the help of the accompanying drawing, in which.

LIST OF REFERENCE NUMERALS

Figure 1:
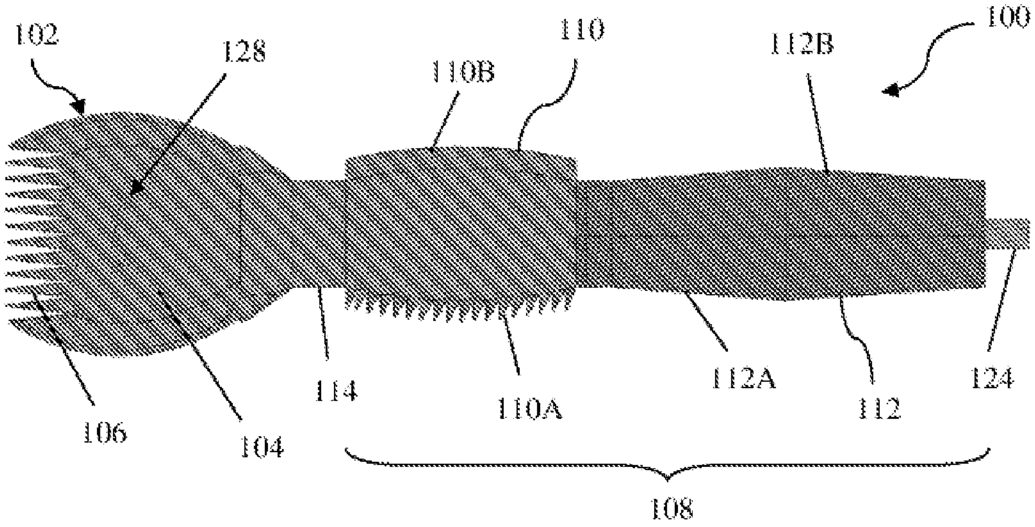
FIG. 1 illustrates a schematic top view of the implement of the present disclosure.

100 implement
102 spork
104 scoop
106 tines
108 handle
110 knife element
110A first lateral edge
10B second lateral edge
112 chopstick
112A lower half of chopstick
112B upper half of chopstick
114 neck
116 first recess
118 first connector
120 slot
122 arcuate concavity
124 straw
126 hole
124A serviette
128 slit
130 aperture

132 storage cavity
134 cap
136 protrusions
138 niche

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the cope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, elements and/or components, but do not forbid the presence or addition of one or more other features, integers, steps, operations, elements, components, and/or groups thereof.

When an element is referred to as being "connected to," or "coupled to" another element, it may be connected or coupled to the other element.

The terms first, second, third, etc., should not be construed to limit the scope of the present disclosure as the aforementioned terms may be only used to distinguish one element or component from another element or component. Terms such as first, second, third etc., when used herein do not imply a specific sequence or order unless clearly suggested by the present disclosure.

Terms such as "inner," "lower," "upper," and the like, may be used in the present disclosure to describe relationships between different elements as depicted front the figures.

Figure 2:
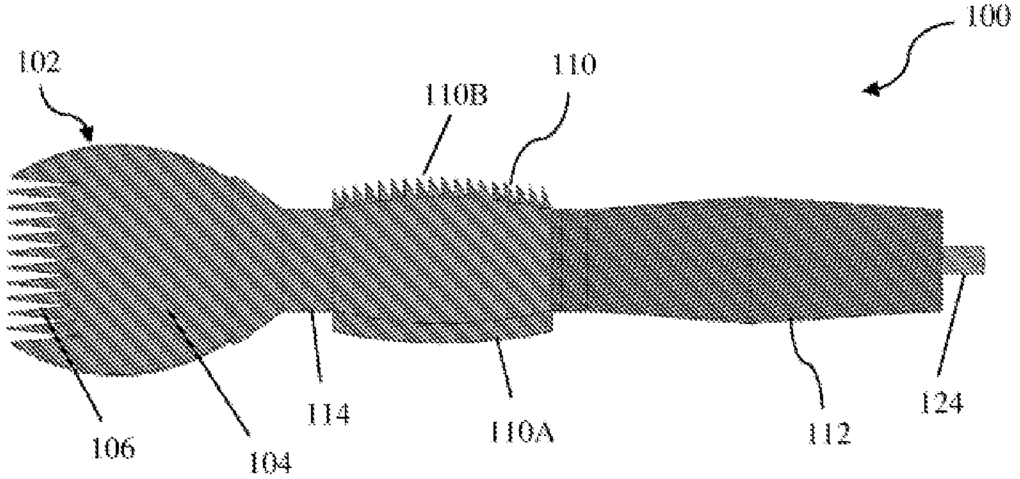
FIG. 2 illustrates a schematic bottom view of the implement of FIG. 1.
Figure 3:
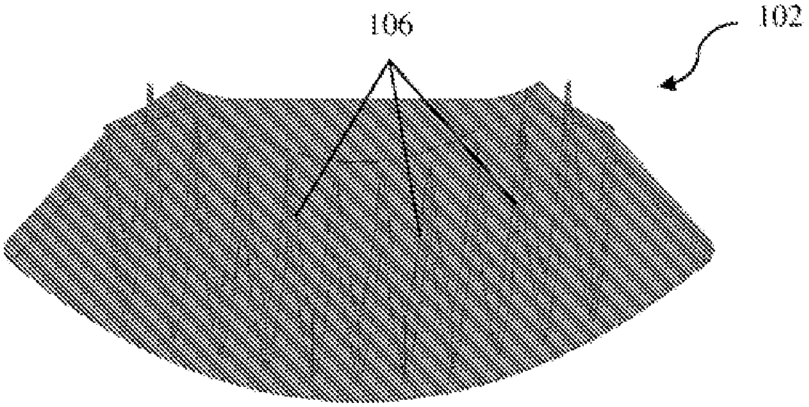
FIG. 3 illustrates a schematic front view of the implement of FIG. 1.
Figure 4:
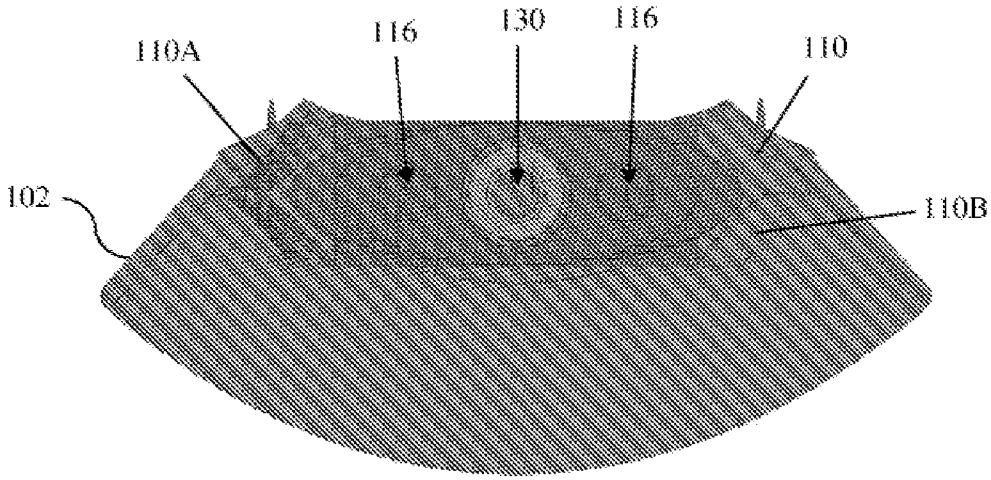
FIG. 4 illustrates a schematic exploded view of the knife element provided with the spork of the implement of FIG. 1.
Figure 5:
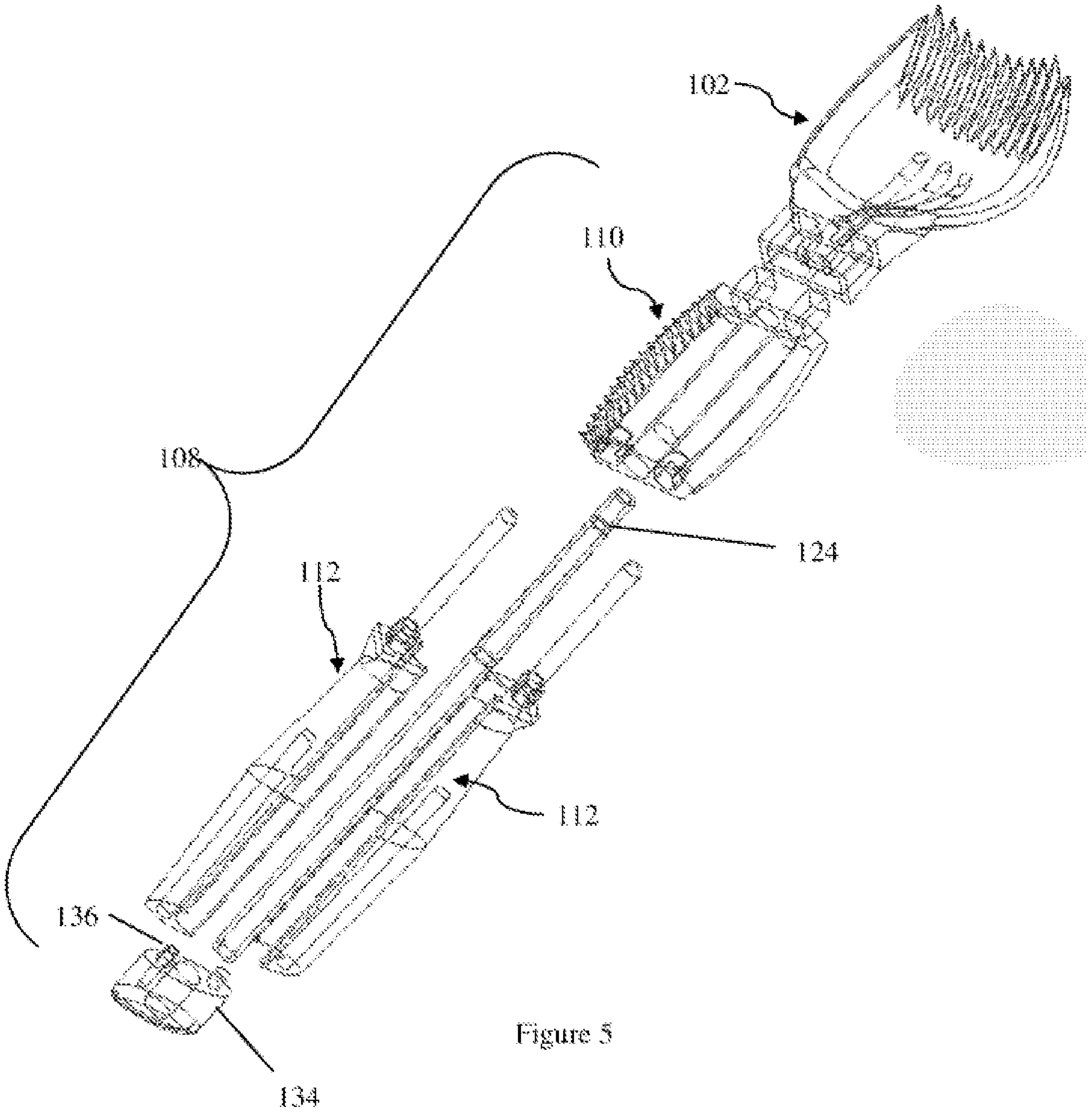
FIG. 5 illustrates a schematic exploded view of the implement of FIG. 1.
Figure 6A:
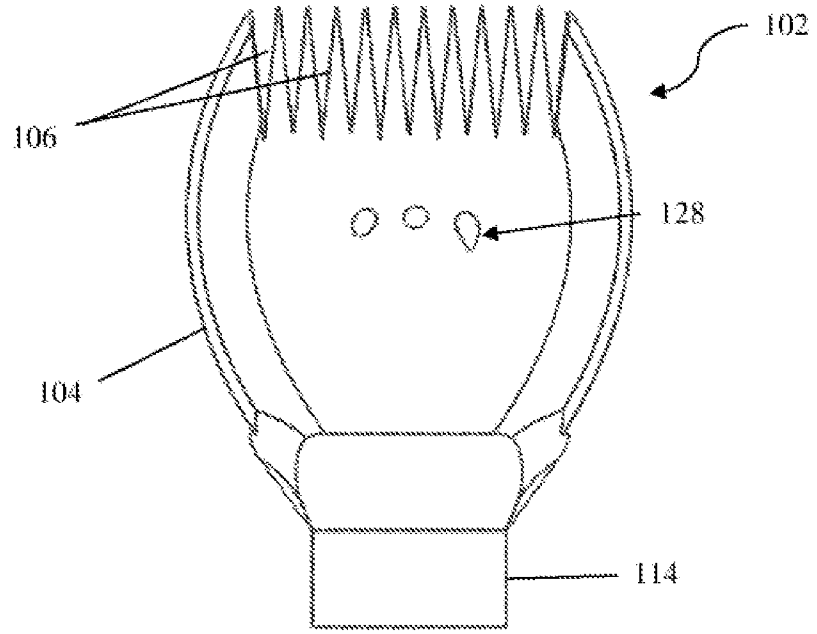
FIG. 6A illustrates a schematic top view of the spork of the implement of FIG. 5.
Figure 6B:
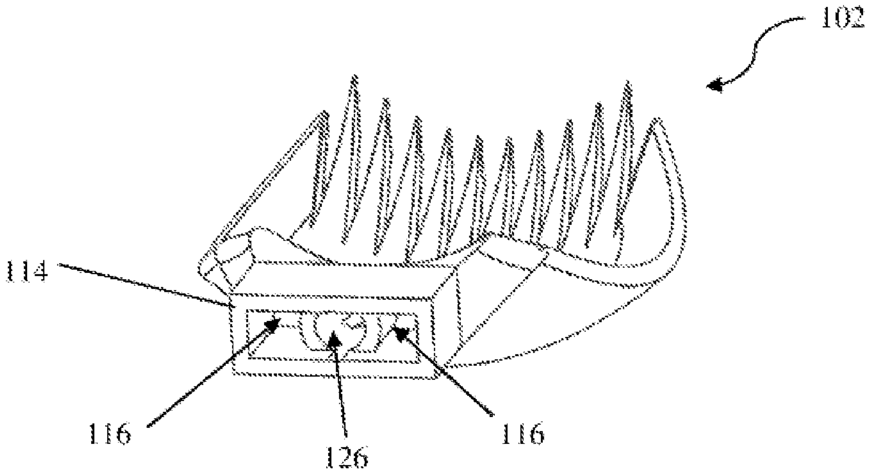
FIG. 6B illustrates a schematic front view of the spork of FIG. 6A.
Figure 7A:
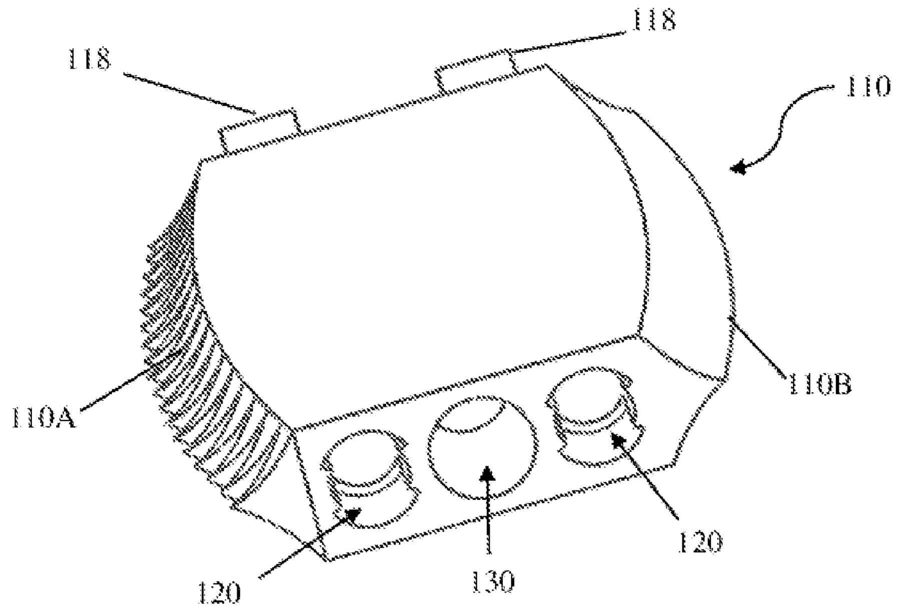
FIG. 7A illustrates a schematic rear view of the knife element of the implement of FIG. 5.
Figure 7B:
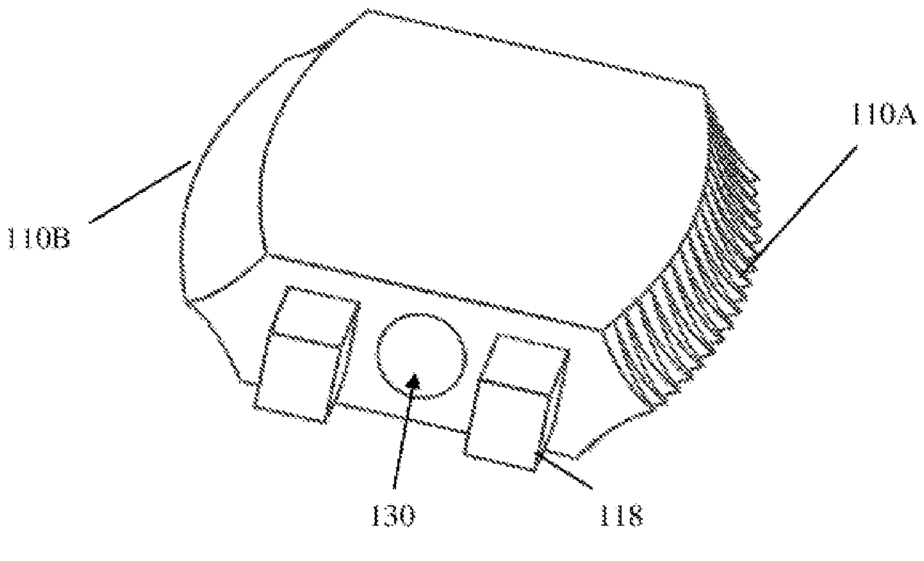
FIG. 7B illustrates a schematic front view of the knife element of FIG. 7A.
Figure 8:
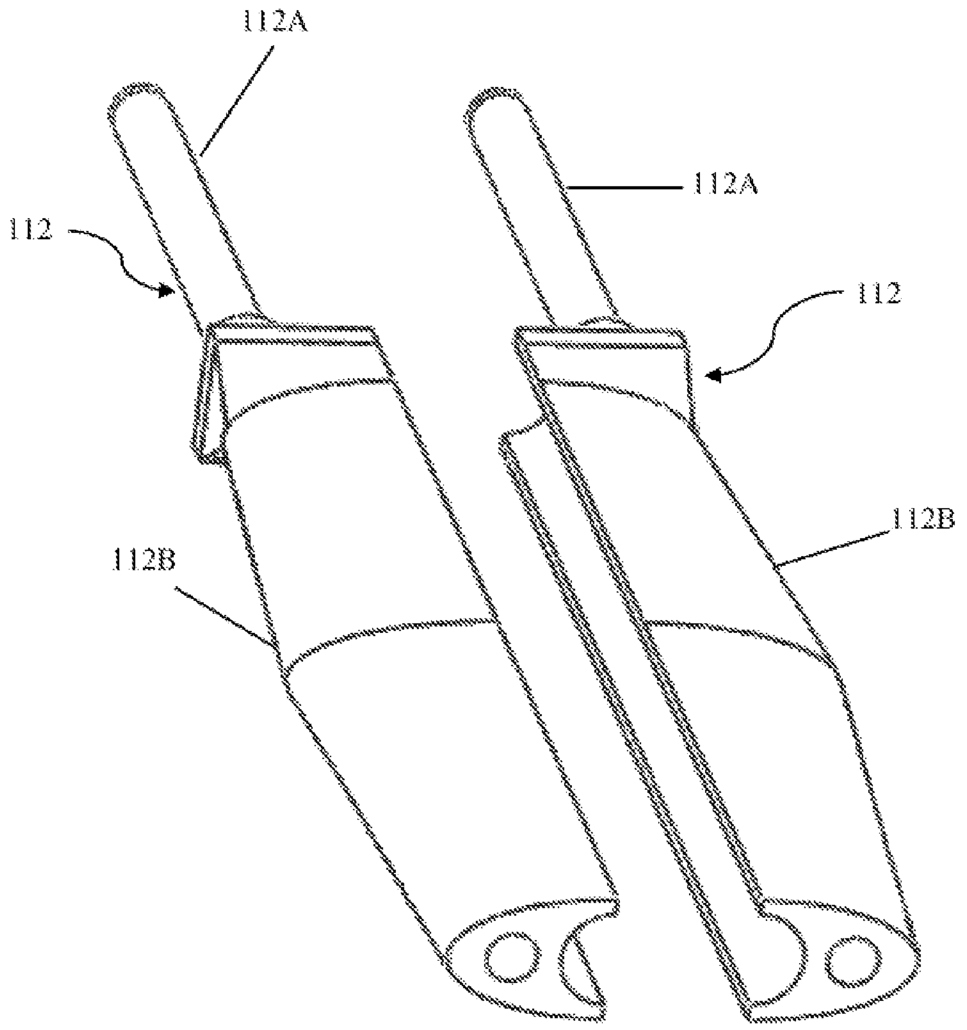
FIG. 8 illustrates a schematic view of the chopsticks of the implement of FIG. 5.
Figure 9A:
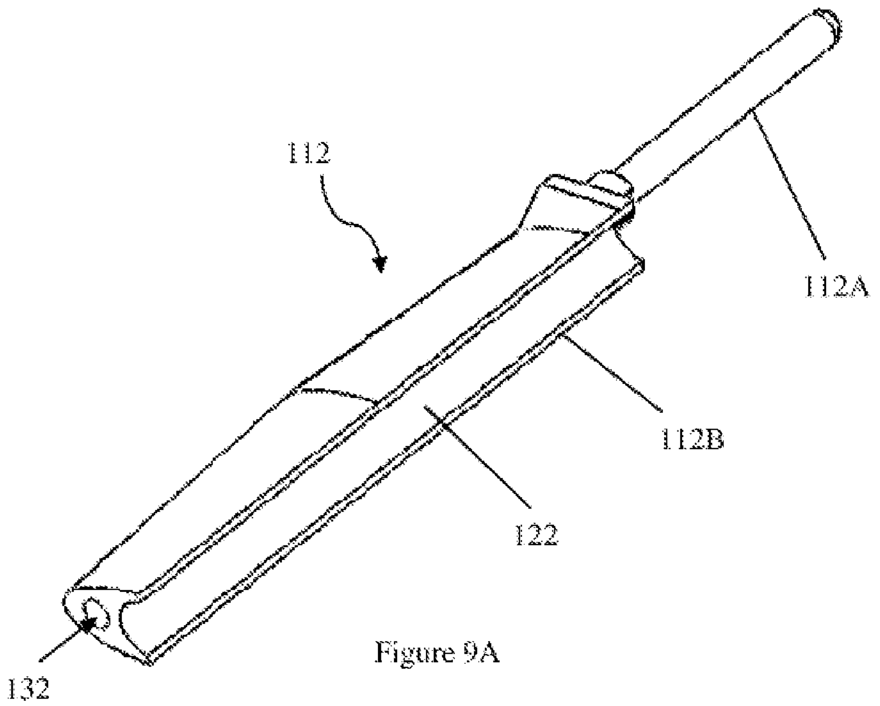
FIG. 9A illustrates a schematic isometric view of a chopstick of FIG. 8.
Figure 9B:
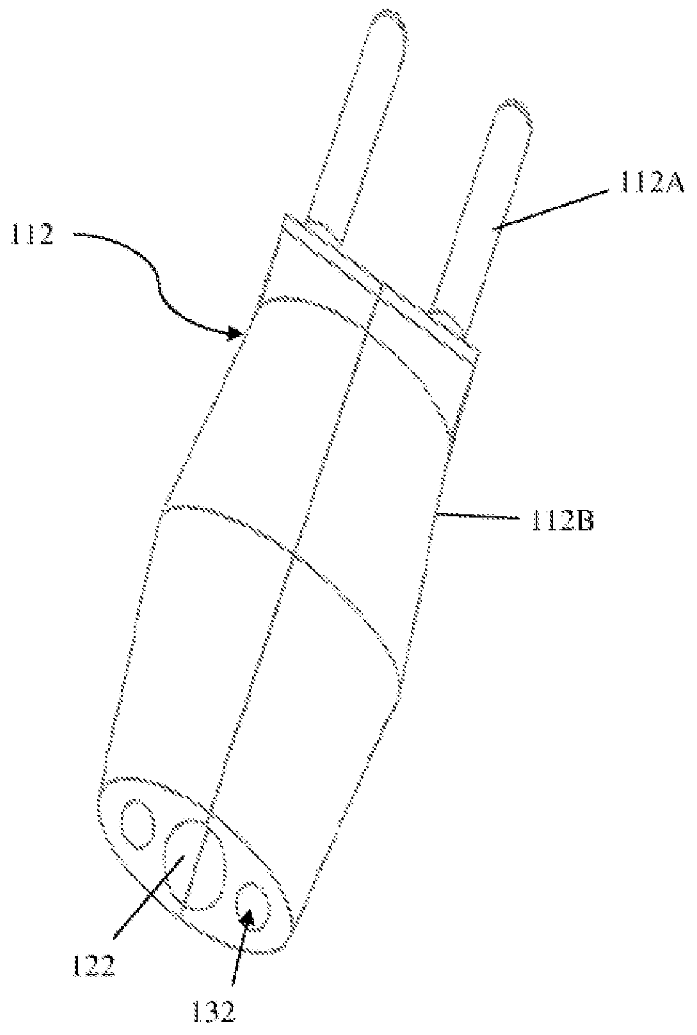
FIG. 9B illustrates a schematic view of the chopsticks of FIG. 8, joined with each other.
Figure 9C:
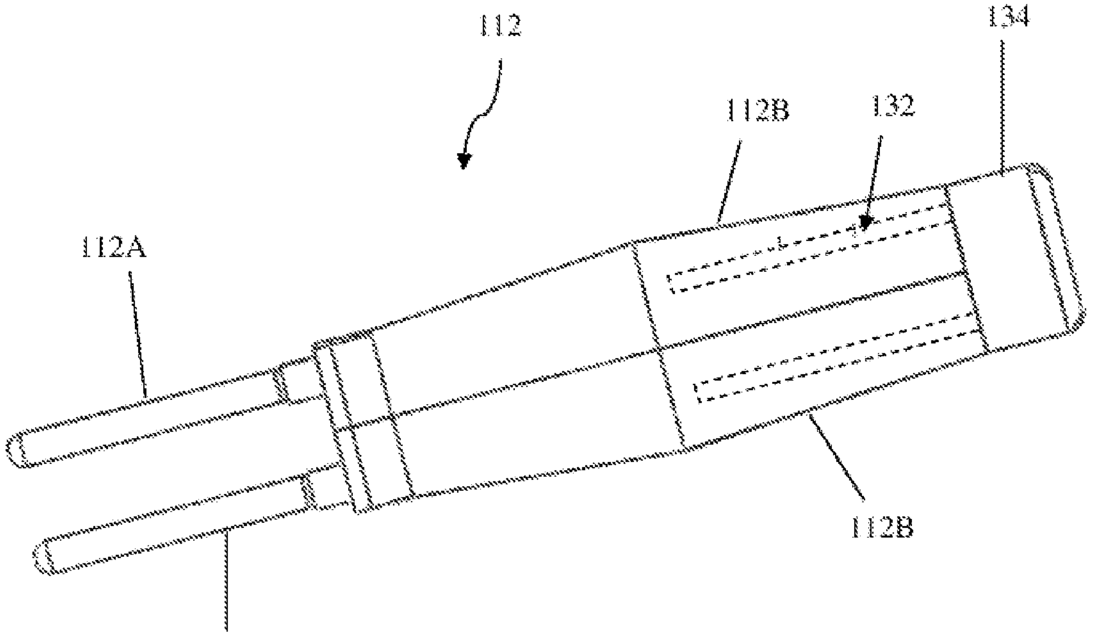
FIG. 9C illustrates a schematic view of the chopsticks of FIG. 9B, fit together with a cap of FIG. 5.
Figure 9D:
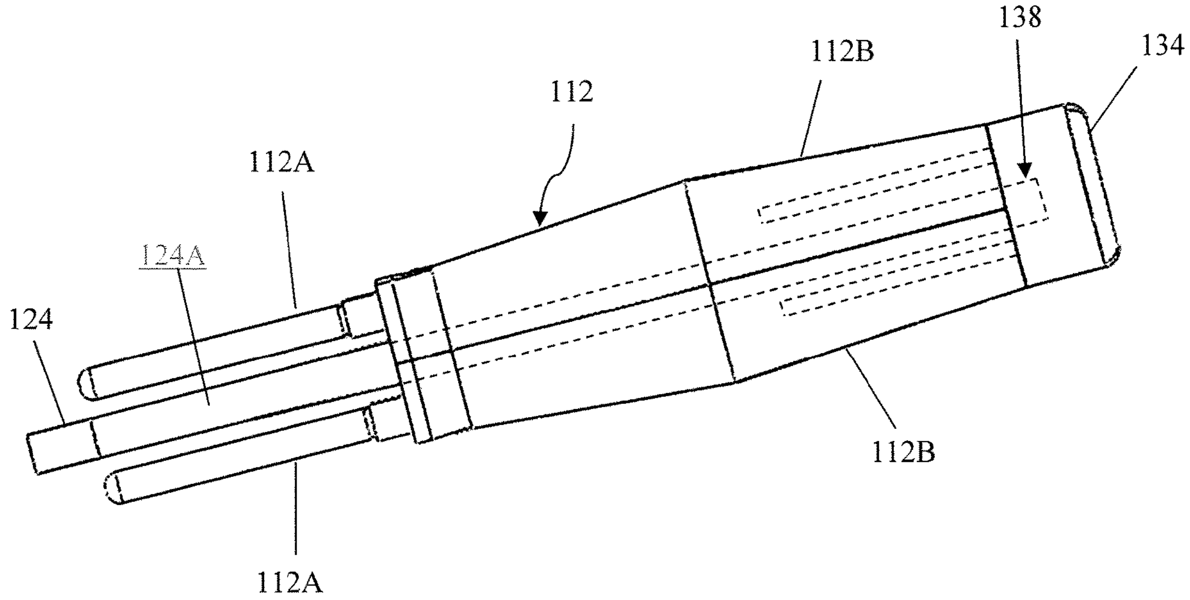
FIG. 9D illustrates a schematic view of a straw, of FIG. 5, nested between the chopsticks, and fit together with the cap of FIG. 9C.

A multi-utilitarian implement (100), of the present disclosure, suitable for use on the dining table will now be described with reference to FIG. 1 through FIG. 9D.

The implement (100) comprises a spork (102) and a handle (108) attached to the spork (102). The spork (102) is defined by a shallow scoop (104) having a plurality of tines (106) configured on a first distal end of the scoop (104). The handle (108) is detachably connected to a second distal end of the scoop (104). The handle (108) comprises a two-edged knife element (110) and a pair of chopsticks (112). The knife element (110) has a pair of lateral edges (110A, 110B), wherein each lateral edge is configured as a type of a knife. The chopsticks (112) are detachably joined to an operative first end of the knife element (110). The chopsticks (112) are configured to act as the handle (108) in an attached state with the knife element (110).

The scoop (104) has a concave configuration which includes a neck (114) configured at a second distal end of the scoop (104). The neck (114) extends to a wider portion configured to terminate into the plurality of tines (106) at the first distal end of the scoop (104).

In an embodiment, one operative end of the two-edged knife element (110) is configured to be detachably attached to the spork (102) and the other operative end of the two-edged knife element (110) is configured to be detachably attached to the pair of chopsticks (112). In a first embodiment the implement 100) is formed by attaching the spork (102) with the knife element (110), and the knife element (110) with the chopsticks (112), in that order. To enable the first embodiment, a pair of first recesses (116) is configured in the neck (114) of the scoop (104). A pair of first connectors (118) is provided on a second operative end of the knife body. Each first connector (118) is configured to be received in the first recess to facilitate detachable connection of the knife element (110) with the spork (102).

In a second embodiment (not illustrated), the implement is formed by attaching a spork with chopsticks, and the chopsticks with a knife element, in that order. To enable the second embodiment, a second recess is configured in the operative upper portion of each chopstick. A pair of second connectors is provided on a first operative end of the knife body. Each connector is configured to be received in the second recess to facilitate detachable connection of the knife element with the chopsticks.

The knife element (110) is defined by a body having a first lateral edge (110A) and a second lateral edge (110B). In an embodiment, the first lateral edge (110A) has a sharp edge configuration defining a dinner knife. In another embodiment, the first lateral edge (110A) has a serrated edge configuration defining a dinner knife, in one embodiment, the second lateral edge (110B) has a blunt edge configuration defining a butter knife. In another embodiment, the second lateral edge (110B) has a non-serrated edge configuration defining a butter knife.

In one embodiment, each chopstick (112) is defined by a narrow operative lower half (112A) and having a blunt end (as in case of Chinese or Korean chopsticks) or a sharp end (like that of a Japanese chopstick), and a wider operative upper half (112B) attached to the operative lower half (112A).

In another embodiment, each chopstick (112) is defined by a body tapering from the wider operative upper half (112B) to the narrow operative lower half (112A), wherein the narrow operative lower half (112A) is provided with a blunt end or a sharp end.

A pair of slots (120) is configured on an operative first end of the knife body to receive the operative lower halves (112A) of the chopsticks (112) therein, in the first embodiment of the present disclosure.

In an embodiment, each chopstick (112) is provided with an arcuate concavity (122) configured on an operative inner side of each chopstick (112), particularly along the length of the wider operative upper half (112B) of the chopstick (112) to enable both chopsticks (112) to be coupled together, in an attached state with the knife element (110) to form the handle (108), and provide integrity to the implement (100), in the attached state.

In another embodiment, the arcuate concavities (122) are configured to define a cavity the between when the chopsticks (112) are coupled together, to detachably nest a straw (124) therein.

In an embodiment, the scoop (104) has a hollow body configuration. A passage is configured inside the hollow body of the scoop (104), such that the passage opens into a hole (126) configured in the neck (114) of the scoop (104). The passage further diverges into at least two slits (128) that are configured on an operative inner surface of the scoop (104) to facilitate passage of a fluid from the inner surface of the scoop (104) to the neck (114).

In an embodiment, an aperture (130) is configured in the knife body complementary to the hole (126), to receive the straw (124). The straw (124) and the knife element (110) am attached to the spork (102) to form a fluid path, that allow the fluid to be pulled in from the slits (128), through the passage into the straw (124) when a sucking force is applied at the straw (124).

In an embodiment, a storage cavity (132) is configured on an operative top half of each of the chopsticks (112). In one embodiment, the storage cavity (132) is configured to store therein a condiment such as salt and pepper. In one embodiment, the storage cavity (132) is configured to store therein a dental hygiene kit such as toothpick or a dental floss.

In an embodiment, the implement (100) includes a cap (134). The cap (134) has a pair of protrusions (136) configured thereon. The cap (134) is configured to securely seal the storage cavities (132), by fitting the protrusions (136) on the storage cavities (132), when the chopsticks (112) are coupled together. As a result, the spillage from the storage cavities (132) is prevented. In an embodiment, a niche (138) is provided in the cap (134) to accommodate a portion of the straw (124) therein to enable usage of the straw (124) while being housed in the handle (108), between the chopsticks (112).

Fitting together the chopsticks (112) and the straw (124) with the cap (134) as a single unit, offers rigidity to the handle (108).

In one embodiment, a serviette (124A) is wrapped the straw (124) and the straw 124 is inserted in the cavity between the chopsticks (112).

The implement (100) allows a user to carry it anywhere without adding to the baggage. Further, the user can separate the spork (102) and the knife, or use the chopsticks (112) while having meals. The straw (124) can be used individually while drinking a beverage, or can be used along with the spork (102) while having fluids such as broth, smoothies, or pureed food, wherein the straw (124) can be used to suck the fluid whereas the spork (102) can be used to stir the contents of the fluid.

In an embodiment, the implement (100) is manufactured from a reusable material which is selected from the group consisting of steel, polypropylene and polystyrene. In another embodiment, the implement (100) is manufactured by 3D printing process. As a result, the implement (100) is easy to be manufactured, cost-effective, and eco-friendly.

The foregoing description of the embodiments has been provided for purposes of illustration and not intended to limit the scope of the present disclosure. Individual components of a particular embodiment are generally not limited to that particular embodiment, but, am interchangeable. Such variations are not to be regarded as a departure from the present disclosure, and all such modifications am considered to be within the scope of the present disclosure.

TECHNICAL ADVANCEMENTS

The present disclosure described herein above has several technical advantages including, but not limited to, the multi-utilitarian implement suitable for use on the dining table, which:

- can be used for a single culinary function, or used simultaneously for multiple culinary functions;
- can be carried anywhere and handled with ease;
- can be packed as a single unit; and
- is reusable.

The embodiments herein, the various features, and advantageous details thereof are explained with reference to the non-limiting embodiments in the following description. Descriptions of well-known components and processing techniques are omitted so as to not unnecessarily obscure the embodiments herein. The examples used herein am intended merely to facilitate an understanding of ways in which the embodiments herein may be practiced and to further enable those of skill in the art to practice the embodiments herein. Accordingly, the examples should not be construed as limiting the scope of the embodiments herein.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and am intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the an from the disclosure herein, whereby it is to be distinctly understood that the foregoing descriptive matter is to be interpreted merely as illustrative of the disclosure and not as a limitation.

I claim:

1. A multi-utilitarian implement (100) suitable for use on the dining table, said implement (100) comprising:

a spork (102) defined by a shallow scoop (104) having a plurality of tines (106) configured on a first distal end of said shallow scoop (104); and a handle (108) detachably connected to a second distal end of said shallow scoop (104), said handle (108) comprising:

a two-edged knife element (110) having a pair of lateral edges (110A, 110B), each lateral edge (110A, 110B) being configured as a type of a knife, and a pair of chopsticks (112) detachably joined to an operative first end of said knife element (110), said pair of chopsticks (112) configured to act as said handle (108) in an attached state with said knife element (110), wherein one operative end of said two-edged knife element (110) is configured to be detachably attached to said spork (102) and the other operative end of said two-edged knife element (110) is configured to be detachably attached to said pair of chopsticks (112).

2. The implement (100) as claimed in claim 1, wherein said shallow scoop (104) has a concave configuration having a neck (114) configured at a second distal end of said shallow scoop (104), said neck (114) extending to a wider portion configured to terminate into said plurality of tines (106) at said first distal end of said shallow scoop (104).

3. The implement (100) as claimed in claim 2, wherein a pair of first recesses (116) is configured in said neck (114).

4. The implement (100) as claimed in claim 1, wherein a pair of first connectors (118) is provided on a second operative end of said knife body, each first connector (118) is configured to be received in said first recess to facilitate detachable connection of said knife element (110) with said spork (102).

5. The implement (100) as claimed in claim 1, wherein said knife element (110) is defined by a body having wherein the pair of lateral edges define a first lateral edge (110A) and a second lateral edge (110B).

6. The implement (100) as claimed in claim 5, wherein said first lateral edge (110A) has a sharp edge configuration defining a dinner knife.

7. The implement (100) as claimed in claim 5, wherein said first lateral edge (110A) has a serrated edge configuration defining a dinner knife.

8. The implement (100) as claimed in claim 5, wherein said second lateral edge (110B) has a blunt edge configuration defining a butter knife.

9. The implement (100) as claimed in claim 5, wherein said second lateral edge (1101B) has a non-serrated edge configuration defining a butter knife.

10. The implement (100) as claimed in claim 9, wherein said shallow scoop (104) has a hollow body configuration, wherein a passage is configured inside said shallow scoop (104) such that said passage opens into a hole (126) configured in said neck (114) of said shallow scoop (104), said passage further diverging into at least two slits (128) configured on an operative inner surface of said shallow scoop (104) to facilitate passage of a fluid from said inner surface of said shallow scoop (104) to said neck (114).

11. The implement (100) as claimed in claim 10, wherein an aperture (130) is configured in the knife body complementary to said hole (126), to receive said straw (124).

12. The implement (10) as claimed in claim 11, wherein said straw (124) and said knife element (110) are attached to said spork (102) to form a fluid path, and allow the fluid to be pulled in from said slits (128), through said passage into said straw (124).

13. The implement (100) as claimed in claim 1, wherein each chopstick (112), of said pair of chopsticks is defined by a narrow operative lower half (112A) configured with a blunt end or a sharp end, and a wider operative upper half (112B) attached to said operative lower half (112A).

14. The implement (100) as claimed in claim 13, wherein a pair of slots (120) is configured on an operative first end of said knife body to receive said operative lower halves (112A) of said pair of chopsticks (112) therein.

15. The implement (100) as claimed in claim 14, wherein a pair of second connectors is provided on a second operative end of said knife body, each connector being configured to be received in said second recess to facilitate detachable connection of said knife element (110) with said pair of chopsticks (112).

16. The implement (100) as claimed in claim 13, wherein a storage cavity (132) is configured on said operative upper half (112B) of each of said pair of chopsticks (112), said storage cavity (132) is configured to store therein a condiment.

17. The implement (100) as claimed in claim 16, wherein said storage cavity (132) is configured to store therein a dental hygiene kit.

18. The implement (100) as claimed in claim 16, which includes a cap (134), said cap (134) configured to securely close said storage cavities (132) when said pair of chopsticks (112) arc coupled together.

19. The implement (100) as claimed in claim 1, wherein each chopstick (112), of said pair of chopsticks is defined by a body tapering from a wider operative upper half (112B) to a narrow operative lower half (112A), said narrow operative lower half (112A) configured with a blunt end or a sharp end.

20. The implement (100) as claimed in claim 1, wherein a second recess is configured in the operative upper portion of each chopstick (112).

21. The implement (100) as claimed in claim 1, wherein each chopstick (112) is provided with an arcuate concavity (122) configured on an operative inner side of each chopstick (112), in an attached state with said knife element (110) to form said handle (108), and provide integrity to the implement (100), in the attached state.

22. The implement (100) as claimed in claim 21, wherein said arcuate concavities (122) are configured to define a cavity therebetween when said pair of chopsticks (112) are coupled together, to nest a straw (124) therein.

23. The implement (100) as claimed in claim 22, wherein said straw (124) is configured to be wrapped with a serviette in a nested state between said pair of chopsticks (112).

24. The implement (100) as claimed in claim 1, wherein said implement (100) is manufactured from a reusable material.

25. The implement (100) as claimed in claim 1, wherein said implement (100) is manufactured by 3D printing process.

* * * * *